US009692684B2

(12) United States Patent
He et al.

(10) Patent No.: US 9,692,684 B2
(45) Date of Patent: Jun. 27, 2017

(54) FORWARDING TABLE PRECEDENCE IN SDN

(71) Applicant: Telefonaktiebolaget L M Ericsson (publ), Stockholm (SE)

(72) Inventors: Jiang He, Beijing (CN); He Wang, Beijing (CN); Zhenning Zhao, Beijing (CN); Xianmin Li, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 161 days.

(21) Appl. No.: 14/478,189

(22) Filed: Sep. 5, 2014

(65) Prior Publication Data

US 2016/0072696 A1    Mar. 10, 2016

(51) Int. Cl.
*H04L 12/755*    (2013.01)
*H04L 12/715*    (2013.01)
*H04L 12/741*    (2013.01)

(52) U.S. Cl.
CPC ............ *H04L 45/021* (2013.01); *H04L 45/54* (2013.01); *H04L 45/64* (2013.01)

(58) Field of Classification Search
CPC ............ H04L 41/0813; H04L 41/0816; H04L 41/0873; H04L 43/026; H04L 45/02; H04L 45/021; H04L 45/38; H04L 45/54; H04L 45/64; H04L 45/745; H04L 41/08; H04L 41/0803; H04L 41/0806; H04L 41/0853;

(Continued)

(56) References Cited

U.S. PATENT DOCUMENTS 5,331,637 A * 7/1994 Francis ................. H04L 12/185
370/408
6,570,875 B1 * 5/2003 Hegde ................. H04L 12/4645
370/389

(Continued)

OTHER PUBLICATIONS

Open Network Foundation, OpenFlow Switch Specification, Sep. 6, 2012, pp. 33-36, §6.4: Flow Table Modification Messages, Open Network Foundation, Version 1.3.1.*

(Continued)

*Primary Examiner* — Michael Thier
*Assistant Examiner* — Eric Nowlin
(74) *Attorney, Agent, or Firm* — Nicholson De Vos Webster & Elliott, LLP

(57) ABSTRACT

Exemplary methods for maintaining a shared forwarding table in a forwarding plane include a first network device operating in a forwarding plane receiving information associated with a first forwarding table from a second network device operating in a control plane, the information including a plurality of entries and precedence information, the precedence information indicating a priority of the plurality of entries of the first forwarding table. The methods further include for each entry of the first forwarding table, determining whether the entry should be inserted in the shared forwarding table based on the precedence information of the first forwarding table and precedence information contained in the shared forwarding table, wherein the precedence information contained in the shared forwarding table indicates a priority of each corresponding entry stored in the shared forwarding table.

25 Claims, 8 Drawing Sheets

(58) Field of Classification Search
CPC .. H04L 41/0856; H04L 45/00; H04L 45/7457; H04L 47/2483; H04L 47/805
See application file for complete search history.

(56) References Cited

U.S. PATENT DOCUMENTS

| | | | | |
|---|---|---|---|---|
| 6,771,653 B1* | 8/2004 | Le Pennec | | H04L 12/5693 370/412 |
| 6,993,031 B2* | 1/2006 | Murase | | H04L 45/00 370/395.32 |
| 7,039,037 B2* | 5/2006 | Wang | | H04L 29/06 370/349 |
| 7,099,323 B1* | 8/2006 | Doong | | H04L 45/00 370/252 |
| 7,146,478 B2* | 12/2006 | Herkerdorf | | H04L 45/00 710/29 |
| 7,171,375 B2* | 1/2007 | Clarke | | G06Q 10/06 705/7.14 |
| 7,209,976 B2* | 4/2007 | Folkes | | H04L 45/00 709/238 |
| 7,213,101 B1* | 5/2007 | Srinivasan | | G11C 15/00 365/49.1 |
| 7,362,700 B2* | 4/2008 | Frick | | H04L 41/0663 370/219 |
| 7,508,829 B2* | 3/2009 | Rangarajan | | H04L 12/5693 370/392 |
| 7,525,919 B2* | 4/2009 | Matsui | | H04L 41/0893 370/238 |
| 7,623,519 B2* | 11/2009 | Tornetta | | H04L 45/00 370/235 |
| 7,769,891 B2* | 8/2010 | Arimilli | | G06F 15/17381 370/235 |
| 7,774,538 B2* | 8/2010 | Hong | | H04L 45/7453 711/108 |
| 7,782,793 B2* | 8/2010 | Olesinski | | H04L 41/0893 370/253 |
| 7,844,778 B2* | 11/2010 | Shen | | G06F 12/127 711/100 |
| 7,936,764 B1* | 5/2011 | Krishnan | | H04L 45/54 370/395.31 |
| 8,391,289 B1* | 3/2013 | Yalagandula | | H04L 12/2818 370/392 |
| 8,468,296 B1* | 6/2013 | Cohen | | G11C 15/00 365/49.1 |
| 8,527,694 B2* | 9/2013 | Gao | | H04L 45/54 711/108 |
| 8,595,302 B2* | 11/2013 | Krishnamurthi | | H04L 12/5855 709/206 |
| 8,750,144 B1* | 6/2014 | Zhou | | H04L 45/54 370/252 |
| 8,848,707 B2* | 9/2014 | Assarpour | | H04L 45/748 370/389 |
| 9,160,650 B2* | 10/2015 | Zhang | | H04L 45/121 |
| 9,262,312 B1* | 2/2016 | Gazit | | G06F 12/00 |
| 9,363,152 B2* | 6/2016 | Groves | | H04L 43/026 |
| 9,385,948 B2* | 7/2016 | Ding | | H04L 45/021 |
| 9,424,366 B1* | 8/2016 | Gazit | | G06F 17/30982 |
| 9,432,283 B2* | 8/2016 | Takashima | | H04L 45/38 |
| 9,484,095 B2* | 11/2016 | Bosshart | | G11C 15/04 |
| 9,485,172 B2* | 11/2016 | Yoshimoto | | H04L 45/28 |
| 9,525,635 B2* | 12/2016 | Matsumura | | H04L 47/215 |
| 9,548,920 B2* | 1/2017 | Narasimha | | H04L 45/38 |
| 2001/0028651 A1* | 10/2001 | Murase | | H04L 45/00 370/392 |
| 2002/0089937 A1* | 7/2002 | Venkatachary | | H04L 45/00 370/255 |
| 2002/0099752 A1* | 7/2002 | Markos | | H04L 67/34 718/1 |
| 2002/0128033 A1* | 9/2002 | Burgess | | G06F 1/3209 455/528 |
| 2003/0033467 A1* | 2/2003 | Yoshizawa | | H04L 29/06 710/305 |
| 2003/0035409 A1* | 2/2003 | Wang | | H04L 29/06 370/349 |
| 2003/0065816 A1* | 4/2003 | Dharmadhikari | | H04L 45/02 709/240 |
| 2003/0188018 A1* | 10/2003 | Guerrero | | H04L 49/253 709/242 |
| 2003/0233516 A1* | 12/2003 | Davis | | H04L 69/12 711/108 |
| 2003/0235195 A1* | 12/2003 | Shenoy | | H04L 12/5601 370/389 |
| 2004/0001485 A1* | 1/2004 | Frick | | H04L 41/0663 370/389 |
| 2004/0073715 A1* | 4/2004 | Folkes | | H04L 45/00 709/250 |
| 2004/0146044 A1* | 7/2004 | Herkerdorf | | H04L 45/00 370/351 |
| 2004/0190454 A1* | 9/2004 | Higasiyama | | H04L 12/4625 370/238 |
| 2004/0190526 A1* | 9/2004 | Kumar | | H04L 45/302 370/395.21 |
| 2005/0027506 A1* | 2/2005 | Kerr | | H04L 45/00 703/27 |
| 2005/0281196 A1* | 12/2005 | Tornetta | | H04L 45/00 370/235 |
| 2006/0031561 A1* | 2/2006 | Bishop | | H04L 63/0209 709/232 |
| 2006/0050702 A1* | 3/2006 | Matsui | | H04L 41/0893 370/392 |
| 2006/0062221 A1* | 3/2006 | Mori | | H04L 45/00 370/392 |
| 2006/0083177 A1* | 4/2006 | Iyer | | H04L 47/10 370/252 |
| 2006/0176721 A1* | 8/2006 | Kim | | G11C 15/00 365/49.16 |
| 2006/0268714 A1* | 11/2006 | Szczepanek | | G01R 31/31858 370/235 |
| 2007/0076606 A1* | 4/2007 | Olesinski | | H04L 41/0893 370/230 |
| 2007/0121524 A1* | 5/2007 | Rangarajan | | H04L 12/5693 370/252 |
| 2007/0171911 A1* | 7/2007 | Ku | | H04L 45/00 370/392 |
| 2008/0080539 A1* | 4/2008 | Hong | | H04L 45/7453 370/402 |
| 2009/0063444 A1* | 3/2009 | Arimilli | | H04L 67/327 |
| 2009/0063445 A1* | 3/2009 | Arimilli | | H04L 45/22 |
| 2010/0205364 A1* | 8/2010 | Gazit | | G06F 17/30982 711/108 |
| 2010/0281218 A1* | 11/2010 | Shen | | G06F 12/127 711/125 |
| 2011/0307655 A1* | 12/2011 | Gao | | H04L 45/7453 711/108 |
| 2012/0300785 A1* | 11/2012 | Liu | | H04L 12/4633 370/395.53 |
| 2013/0046882 A1* | 2/2013 | Takashima | | H04L 45/38 709/224 |
| 2013/0163426 A1* | 6/2013 | Beliveau | | H04L 67/327 370/235 |
| 2013/0266007 A1* | 10/2013 | Kumbhare | | H04L 45/56 370/389 |
| 2013/0276135 A1* | 10/2013 | Conklin | | G06F 21/554 726/27 |
| 2013/0308651 A1* | 11/2013 | Ding | | H04L 45/021 370/401 |
| 2013/0329578 A1* | 12/2013 | Groves | | H04L 43/026 370/252 |
| 2014/0016647 A1* | 1/2014 | Yoshida | | H04L 12/4666 370/395.53 |
| 2014/0086248 A1* | 3/2014 | Assarpour | | H04L 45/748 370/392 |
| 2014/0108632 A1* | 4/2014 | Narasimha | | H04L 45/38 709/223 |
| 2014/0254605 A1* | 9/2014 | Anumala | | H04L 45/38 370/401 |
| 2014/0317256 A1* | 10/2014 | Jiang | | H04L 45/02 709/223 |

(56) References Cited

U.S. PATENT DOCUMENTS

| | | | | |
|---|---|---|---|---|
| 2014/0341030 | A1* | 11/2014 | Kuo | H04L 47/122 370/235 |
| 2014/0369348 | A1* | 12/2014 | Zhang | H04L 45/121 370/389 |
| 2015/0012484 | A1* | 1/2015 | Jindal | G06F 17/30289 707/609 |
| 2015/0023147 | A1* | 1/2015 | Lee | H04L 45/38 370/216 |
| 2015/0103989 | A1* | 4/2015 | Nowack | H04M 15/8044 379/121.01 |
| 2015/0172174 | A1* | 6/2015 | Kojima | H04L 47/2483 370/392 |
| 2015/0262668 | A1* | 9/2015 | Bosshart | G11C 15/04 365/49.11 |
| 2015/0312142 | A1* | 10/2015 | Barabash | H04L 45/42 370/400 |
| 2015/0326477 | A1* | 11/2015 | Fujita | H04L 45/54 370/392 |
| 2015/0372902 | A1* | 12/2015 | Giorgetti | H04L 45/64 370/219 |
| 2015/0382278 | A1* | 12/2015 | Fallon | H04W 40/04 370/338 |
| 2016/0014028 | A1* | 1/2016 | He | H04L 45/745 370/392 |
| 2016/0020993 | A1* | 1/2016 | Wu | H04L 45/14 370/392 |
| 2016/0134536 | A1* | 5/2016 | Wang | H04L 45/7457 370/392 |
| 2016/0134537 | A1* | 5/2016 | Huynh | H04L 45/7457 709/238 |
| 2016/0149779 | A1* | 5/2016 | Sampath | H04L 43/0817 370/250 |
| 2016/0234386 | A1* | 8/2016 | Wawrzynowicz | H04M 3/5141 |
| 2016/0254997 | A1* | 9/2016 | Kurudi Matada | H04L 45/745 |
| 2016/0277297 | A1* | 9/2016 | Chang | H04L 45/54 |
| 2016/0285705 | A1* | 9/2016 | Groves | H04L 43/026 |
| 2016/0285754 | A1* | 9/2016 | Ding | H04L 45/021 |
| 2016/0301601 | A1* | 10/2016 | Anand | H04L 69/22 |
| 2016/0315881 | A1* | 10/2016 | Pierson | H04L 49/35 |
| 2016/0323189 | A1* | 11/2016 | Ahn | H04L 47/6215 |
| 2016/0360352 | A1* | 12/2016 | Khan | H04L 45/70 |

OTHER PUBLICATIONS

Haleplidis, et al., "SDN Layers and Architecture Terminology", draft-haleplidis-sdnrg-layer-terminology-05, SDNRG, Internet-Draft, Internet Engineering Task Force (IETF), (Jul. 4, 2014), 29 pages.

* cited by examiner

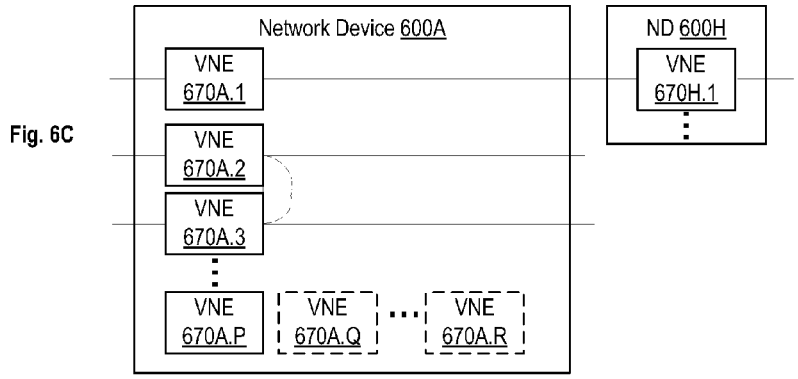
Fig. 6C
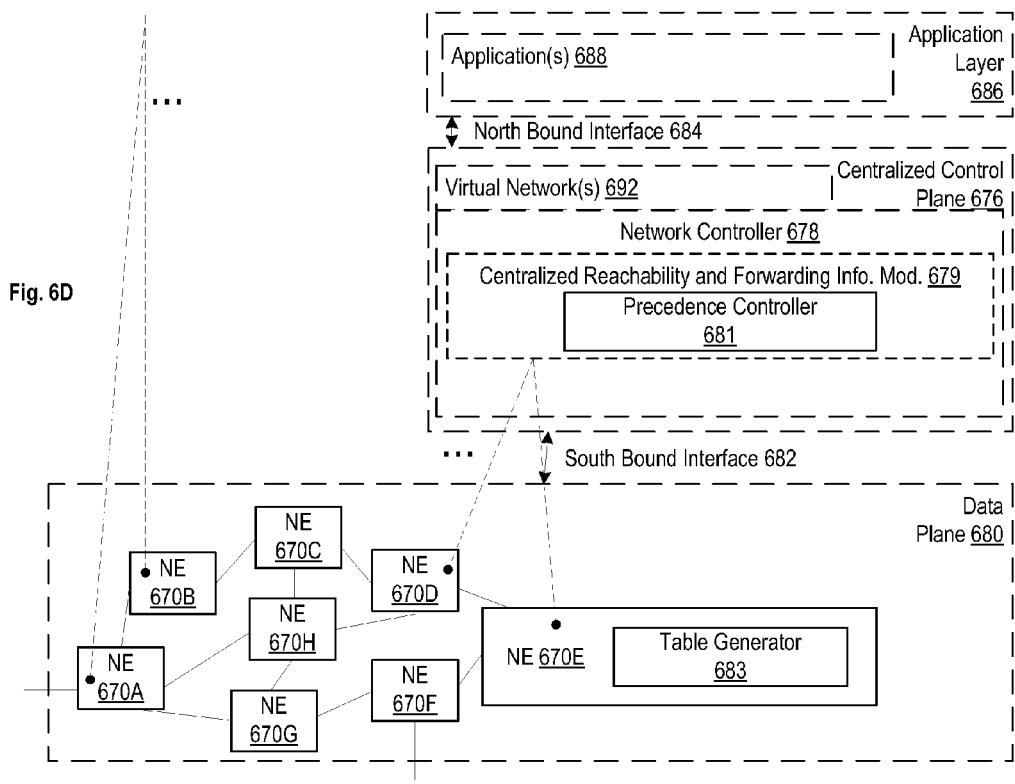
Fig. 6D
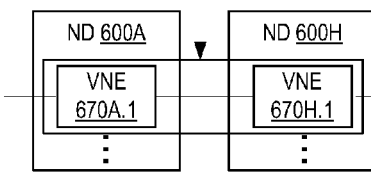
Fig. 6E
Fig. 6F

FORWARDING TABLE PRECEDENCE IN SDN

FIELD

Embodiments of the invention relate to the field of packet networks; and more specifically, to the maintenance of a shared forwarding table using precedence information.

BACKGROUND

Software defined networking (SDN) is an approach to networking that enables applications to communicate with and manipulate the control software of network devices and resources. A key aspect of SDN is the abstraction between the forwarding and the control/management planes in order to separate them and provide applications with the means necessary to control the network. This separation provides faster innovation cycles at both planes.

In SDN, the control plane and the forwarding plane communicate via a southbound interface using protocols such as Forwarding and Control Element Separation (ForCES), Network Configuration Protocol (NETCONF), and Interface to the Routing System (I2RS). Through the southbound interface, the control plane manages the forwarding plane behavior by manipulating the corresponding forwarding tables.

There are two categories of forwarding tables. The first category of forwarding tables utilizes an exact match to map an input key (e.g., a Multiprotocol Label Switching (MPLS) label, a Media Access Control (MAC) address, Virtual Local Area Network identifier (VLAN ID), etc.) to an output set of forwarding information (e.g., a MPLS label, an egress port identifier (ID), VLAN ID, etc.). The second category of forwarding tables utilizes a wild card match. Exact match forwarding tables include the Forwarding DataBase (FDB), Label Forwarding Information Base (LFIB), VLAN Translation (VT) table, etc. Exact match forwarding tables are typically implemented as hash tables.

In a traditional network architecture, each exact match forwarding table is implemented using its own dedicated hardware resources (e.g., memory). In SDN, however, the exact match forwarding tables are typically are implemented using shared hardware resources. Such an architecture relieves the network designer from having to plan and allocate dedicated resources for each forwarding table, and provides more possibilities for programming, scalability, performance, etc.

Although multiple forwarding tables may share the same common forwarding table, in some instances, the forwarding tables may have different performance requirements, e.g., due to service-level agreements (SLAs) or due to the purpose of the forwarding tables. For example, an administrator may determine that a VT table should have higher precedence (i.e., priority) than the FDB because each VLAN translation entry could represent many traffic flows while each FDB entry represents only one traffic flow.

A conventional control plane does not provide a mechanism for distributing precedence information of forwarding tables to the forwarding plane. Without such precedence information, when a new forwarding table entry collides with a forwarding table entry currently stored in the shared forwarding table, the forwarding plane is not able to determine whether the new forwarding table entry should be discarded, or the forwarding table entry currently stored in the shared forwarding table should be evicted and discarded. The result is that the forwarding tables with higher precedence may not be allocated the needed hardware resources, and the corresponding traffic is interrupted because their forwarding information are not available in the shared forwarding table. Thus, there is a need for a mechanism in a control plane to distribute precedence information of forwarding tables to the forwarding plane in order to enable the forwarding plane to intelligently determine which forwarding table entries should be discarded when there is limited resources in the shared forwarding table.

SUMMARY

Exemplary methods performed by a first network device operating in a forwarding plane for maintaining a shared forwarding table based on forwarding table precedence information received from a second network device operating in a control plane, wherein the shared forwarding table implements a plurality of forwarding tables, include receiving information associated with a first forwarding table from the second network device, the information including a plurality of entries and precedence information, the precedence information indicating a priority of the plurality of entries of the first forwarding table. In one embodiment, the methods further include for each entry of the first forwarding table, determining whether the entry should be inserted in the shared forwarding table based on the precedence information of the first forwarding table and precedence information contained in the shared forwarding table, wherein the precedence information contained in the shared forwarding table indicates a priority of each corresponding entry stored in the shared forwarding table.

According to one embodiment, for each entry of the first forwarding table, determining whether the entry should be inserted in the shared forwarding table comprises determining a first candidate location in the shared forwarding table for a first entry of the first forwarding table, and in response to determining the first candidate location is occupied by a first entry stored in the shared forwarding table, determining whether the first entry stored in the shared forwarding table should be evicted from the first candidate location based on the precedence information of the first entry of the first forwarding table and precedence information of the first entry stored in the shared forwarding table.

According to one embodiment, in response to determining the precedence information of the first entry stored in the shared forwarding table indicating it has a priority that is higher than or equal to a priority of the first entry of the first forwarding table, determining a second candidate location in the shared forwarding table for the first entry of the first forwarding table.

According to one embodiment, in response to determining the precedence information of the first entry of the first forwarding table indicating it has a higher priority than the first entry stored in the shared forwarding table, the methods further include evicting the first entry stored in the shared forwarding table from the first candidate location, inserting the first entry of the first forwarding table in the first candidate location, and determining a second candidate location in the shared forwarding table for the evicted first entry that was stored in the first candidate location.

According to one embodiment, the methods further include prior to determining each candidate location, determining whether a number of attempts at determining the candidate location has reached a predetermined threshold, and in response to determining the number of attempts has reached the predetermined threshold, discarding an entry for which the candidate location is being determined.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments of the invention.

FIG. 6D illustrates a network with a single network element (NE) on each of the NDs of FIG. 6A, and within this straight forward approach contrasts a traditional distributed approach (commonly used by traditional routers) with a centralized approach for maintaining reachability and forwarding information (also called network control), according to some embodiments of the invention.

FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention.

DESCRIPTION OF EMBODIMENTS

Figure 1:
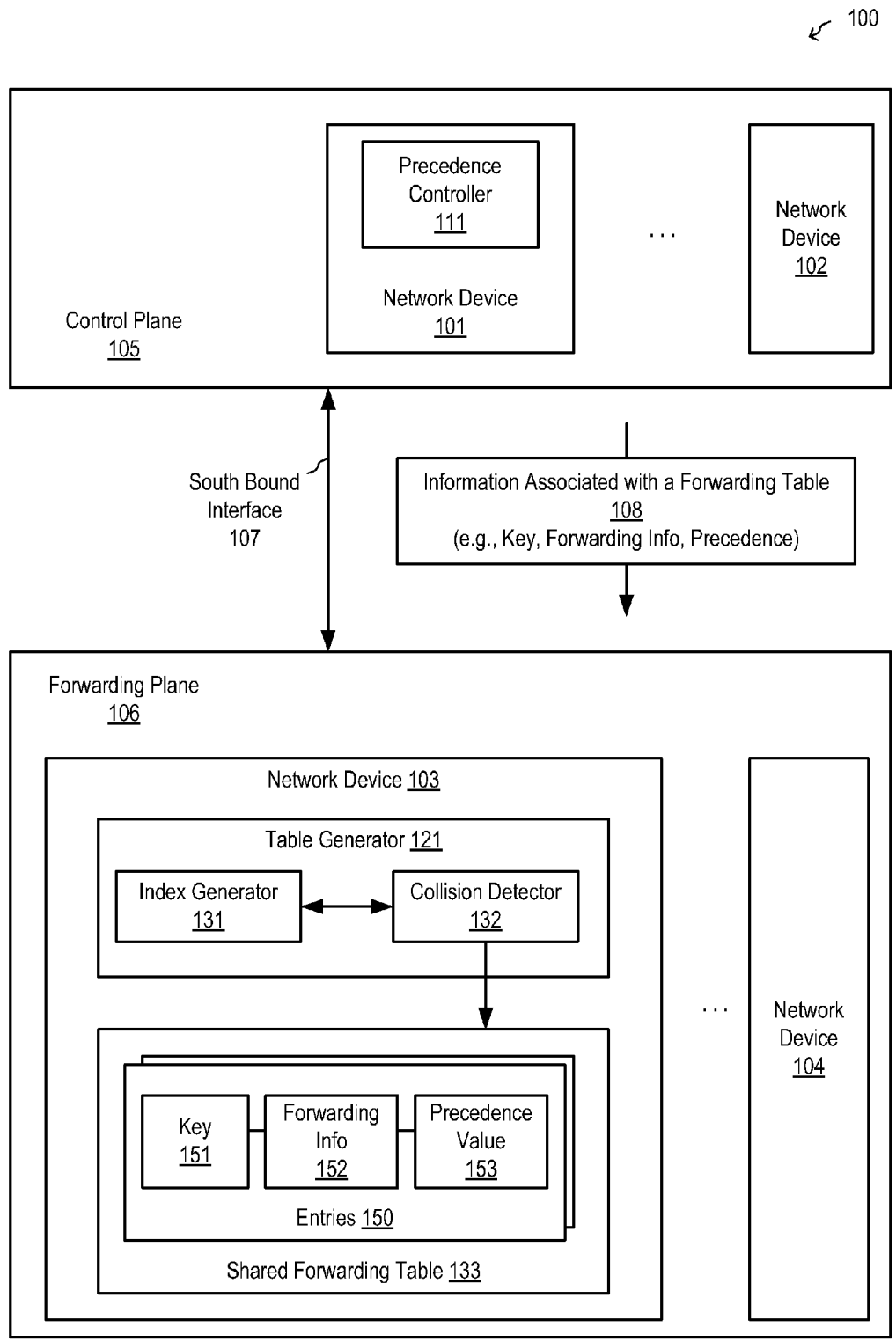
FIG. 1 is a block diagram illustrating a SDN network according to one embodiment.

The following description describes methods and apparatuses for maintaining a shared forwarding table based on precedence information of forwarding tables. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques for maintaining a shared forwarding table (e.g., a hash table) using precedence information of forwarding tables are described herein. As used herein, a "shared forwarding table" refers to a forwarding table that implements multiple forwarding tables using a predetermined set of hardware resources (e.g., memory). According to one aspect of the invention, a first network device (e.g., a network device operating in a control plane) determines that a first forwarding table (e.g., an exact match forwarding table, such as a LFIB, FDB, VT table, etc.) must be generated (or updated) by a forwarding plane. The first forwarding table, for example, may be implemented as part of a shared forwarding table in the forwarding plane. In response to determining that the first forwarding table must be generated or updated, the first network device generates information associated with the first forwarding table. In one embodiment, the information includes a plurality of entries of the first forwarding table, and a precedence value of the first forwarding table. In such an embodiment, the precedence information indicates the priority of the first forwarding table entries. Throughout the description, a "forwarding table entry" shall simply be referred to as an "entry." The first network device then sends the information associated with the first forwarding table to a second network device (e.g., a network device operating in a forwarding plane).

According to one aspect of the invention, in response to receiving the information associated with the first forwarding table, the second network device (e.g., a network device operating in a forwarding plane) attempts to insert the entries of the first forwarding table in a shared forwarding table. In one embodiment, for each entry in the received information associated with the first forwarding table, the second network device determines a first candidate location in the shared forwarding table in which the entry may be inserted. Throughout the description, a "location in the shared forwarding table" shall simply be referred to as a "location." The second network device determines whether the first candidate location already contains another entry (herein referred to as a "collision").

In response to determining there is no collision (i.e., the first candidate location is not occupied by another entry), the second network device inserts the entry of the first forwarding table in the first candidate location. Alternatively, in response to determining there is a collision (i.e., the first candidate location is occupied by another entry), the second network device determines whether the number of collision resolution attempts has reached a predetermined threshold. As used herein, "collision resolution" refers to a process of determining a candidate location that is not occupied by any entry.

In response to determining the number of collision resolution attempts has reached the predetermined threshold, the second network device discards the entry of the first forwarding table. Alternatively, in response to determining the number of collision resolution attempts has not reached the predetermined threshold, the second network device determines whether the precedence information of the first forwarding table indicates its entries have a higher priority than the entry that currently occupies the first candidate location. Throughout the description, an entry with a higher precedence value is described as having a higher priority than an entry with a lower precedence value. Other conventions, however, can be used.

In response to determining the entry of the first forwarding table does not have a higher precedence than the entry which currently occupies the first candidate location, the second network device determines a second candidate location, and the process is repeated until an unoccupied location is found, a location containing an entry with a lower precedence is found, or the number of collision resolution attempts has been reached the predetermined threshold, in which case the entry is discarded. Alternatively, in response to determining the entry of the first forwarding table has a higher precedence than the entry that currently occupies the first candidate location, the second network device evicts the entry that currently occupies the first candidate location, and inserts the entry from the first forwarding table in its place. The second network device then attempts to find an unoccupied location (or a location containing an entry with a lower precedence) for the evicted entry by repeating the above process. Thus, contrary to a conventional forwarding plane network device, the second network device of the present invention ensures that entries which belong to forwarding tables with higher precedence are guaranteed to be allocated the needed resources by utilizing precedence information provided by the first network device of the control plane. Embodiments of the present invention shall now be described in greater details through the description of various figures.

FIG. 1 is a block diagram illustrating network 100 according to one embodiment. Network 100 includes control plane 105 and forwarding plane 106. In the illustrated embodiment, control plane 105 includes network devices 101-102. It shall be understood, however, that more network devices can be included as part of control plane 105. Forwarding plane 106 includes network devices 103-104. It shall be understood, however, that more network devices can be included as part of forwarding plane 106. In one embodiment, network devices 101-102 of control plane 105 communicate with network devices 102-103 of forwarding plane 106 via southbound interface 107 using protocols such as Forwarding and Control Element Separation (ForCES), Network Configuration Protocol (NETCONF), and Interface to the Routing System (I2RS). Other protocols, however, can be utilized to implement southbound interface 107 without departing from the broader scope and spirit of the present invention.

A conventional control plane does not include a mechanism for distributing the precedence information of the forwarding tables to a conventional forwarding plane. As used herein, "precedence information" refers to information that identifies the priority of a forwarding table. As set forth above, without such precedence information, a conventional forwarding plane cannot determine which entry to store in the shared forwarding table when there is insufficient resources to store all entries. Embodiments of the present invention overcome these limitations by providing techniques for a control plane to distribute precedence information to a forwarding plane, and techniques for the forwarding plane to maintain a shared forwarding table using the precedence information.

According to one embodiment, network device 101 includes precedence controller 111. Precedence controller 111 is to generate information associated with forwarding tables that are to be implemented in forwarding plane 106 (e.g., as part of shared forwarding table 133). The information associated with each forwarding table includes information that are required by forwarding plane 106 in order to generate the respective forwarding table. For example, the generated information associated with each forwarding table may include the entries of the respective forwarding table. The content of each entry may vary, depending on the type of forwarding table. For example, each entry may contain an input key and a corresponding output forwarding information. Here, the input key maps to the output forwarding information. For example, an incoming packet that contains the input key is forwarded using the corresponding output forwarding information.

The content which is included as part of the input key and output forwarding information depends on the type of forwarding table. For example, in the case of a LFIB, the input key may be a MPLS label, the output forwarding information may be another MPLS label and an egress port ID. In such an example, an incoming MPLS packet that includes the "input" MPLS label is retagged with the "output" MPLS label and forwarded to the egress port identified by the egress port ID. In the case of a FDB, the input key may be a MAC address and the output forwarding information may be an egress port ID. In the case of a VT table, the input key may be a VLAN ID and the output forwarding information may be another VLAN ID. The types of keys and forwarding information are described for illustrative purposes, and not intended to be limitations of the present invention. The present invention applies equally to any input key that maps to any output information.

In one embodiment, precedence controller 111 is also configured to determine the precedence information of the forwarding tables in forwarding plane 106. The precedence information identifies the priority/importance of each forwarding table. The precedence information is included as part of the information associated with each forwarding table, which is sent to forwarding plane 106 as part of information associated with a forwarding table 108 (herein referred to as forwarding table information 108).

Throughout the description, the precedence information of a forwarding table is described as part of an entry. It shall be understood that the precedence information need not be sent as part of each entry. For example, forwarding table information 108 may include a single precedence value identifying the precedence of the forwarding table, which applies to all entries of the respective forwarding table. Further, the precedence value may be sent as part of the same or different packet/message that contains the entries. For example, network device 101 may send the precedence value in a message separate from the message that includes the key and forwarding information. It shall be appreciated that forwarding table information 108 may include information for one or more forwarding tables. The information associated with each forwarding table may also be sent as multiple messages to forwarding plane 106. Further, the information contained in forwarding table information 108 described above is for illustrative purposes. More or less information can be included as part of forwarding table information 108.

According to one embodiment, network device 103 includes table generator 121 for generating forwarding tables as part of shared forwarding table 133, using forwarding table information 108 received from control plane 105. Shared forwarding table 133 may be implemented in memory, or in a persistent storage device (which can be loaded into memory during operation). In one embodiment, table generator 121 is configured to generate shared forwarding table 133 as a hash table. In one embodiment, shared forwarding table 133 includes entries 150 which contain information received as part of forwarding table information 108. For example, each of entries 150 includes, but not limited to, key 151 (which contains an input key as described above), forwarding info 152 (which contains a corresponding output forwarding information as described above), and precedence value 153 (which contains the precedence information of the entry). More or less information can be included as part of each entry of entries 150.

Table generator 121 includes, but not limited to, index generator 131 and collision detector 132. According to one embodiment, for each entry in forwarding table information 108, index generator 131 is configured to generate (e.g., by using a hash function) an index. Throughout the description, an entry included in forwarding table information 108 shall be referred to as a "new entry". As used herein, an "index" refers to a value that points to (i.e., references) a location in shared forwarding table 133. Here, the index points to a candidate location where a new entry may be inserted. Index generator 131 forwards the generated index to collision detector 132, which is responsible for determining whether there is a collision at the candidate location. For example, collision detector 132 determines whether the referenced location already contains another entry. In one embodiment, in response to determining there is no collision, collision detector 132 inserts the new entry at the candidate location.

Figure 2:
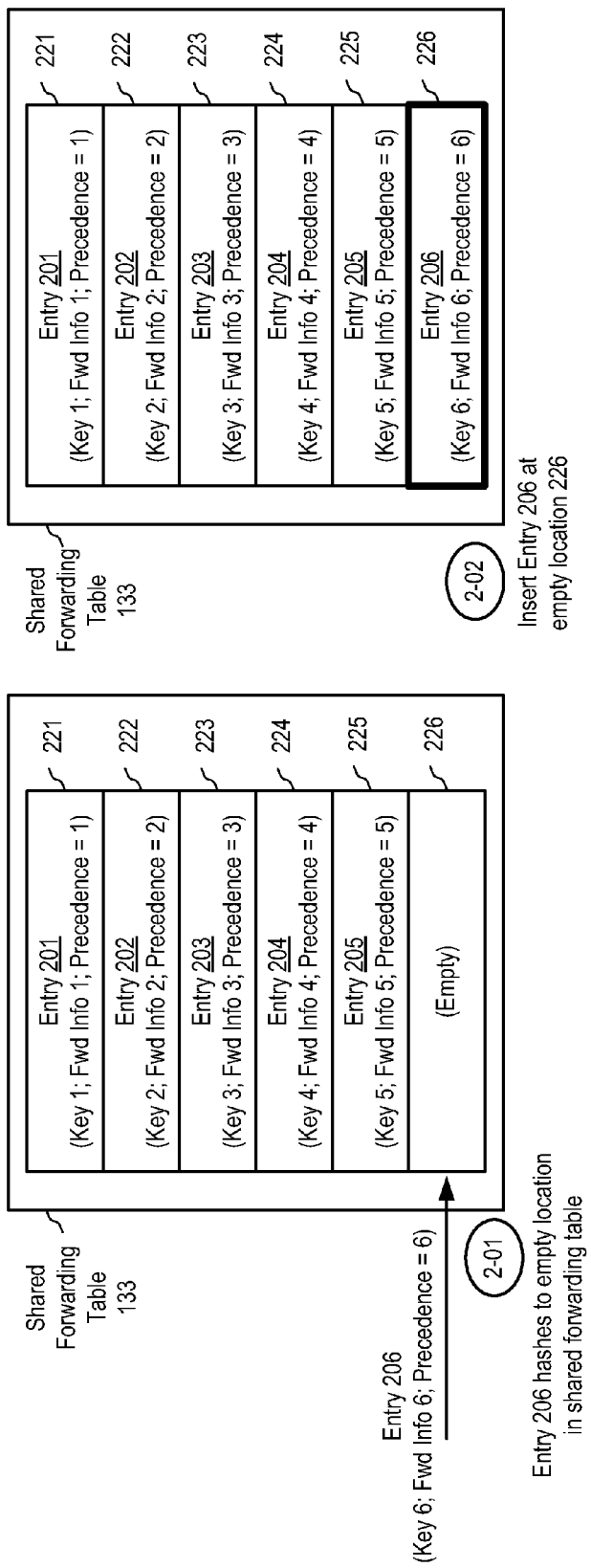
FIG. 2 is a block diagram illustrating an example of inserting an entry in a shared forwarding table according to one embodiment.

FIG. 2 is a block diagram illustrating an example of inserting a forwarding table entry at an unoccupied location in shared forwarding table 133. In FIG. 2, shared forwarding table 133 includes locations 221-226. Locations 221-225 are occupied by entries 201-205, respectively, and location 226 is unoccupied. Entries 201-205 have the precedence values 1-5, respectively.

At transaction 2-01, index generator 131 generates an index for unprocessed entry 206. As used herein, an "unprocessed entry" refers to an entry which needs to be inserted in shared forwarding table 133. An unprocessed entry can be a new entry (i.e., an entry included as part of forwarding table information 108) or an entry that has been evicted because of the new entry. In this example, the generated index points to location 226. At transaction 2-02, collision detector 132 determines that there is no collision because location 226 is currently not occupied by any entry. In response to determining there is no collision, collision detector 132 inserts entry 206 at location 226.

Referring now back to FIG. 1. In one embodiment, in response to determining there is a collision, collision detector 132 determines whether the number of collision resolution attempts have reached a predetermined threshold. If so, the new entry is discarded. Otherwise, collision detector 132 determines whether the entry which currently occupies the candidate location should be evicted in order to make room for the new entry. In one embodiment, collision detector 132 performs such a determination based on precedence information. In one such embodiment, in response to determining the entry that currently occupies the candidate location has a precedence value that is greater than or equal to the precedence value of the new entry, collision detector 132 attempts to perform collision resolution for the new entry until an unoccupied location is found, a location containing an entry with a lower precedence is found, or the number of collision resolution attempts has reached the predetermined threshold.

Figure 3:
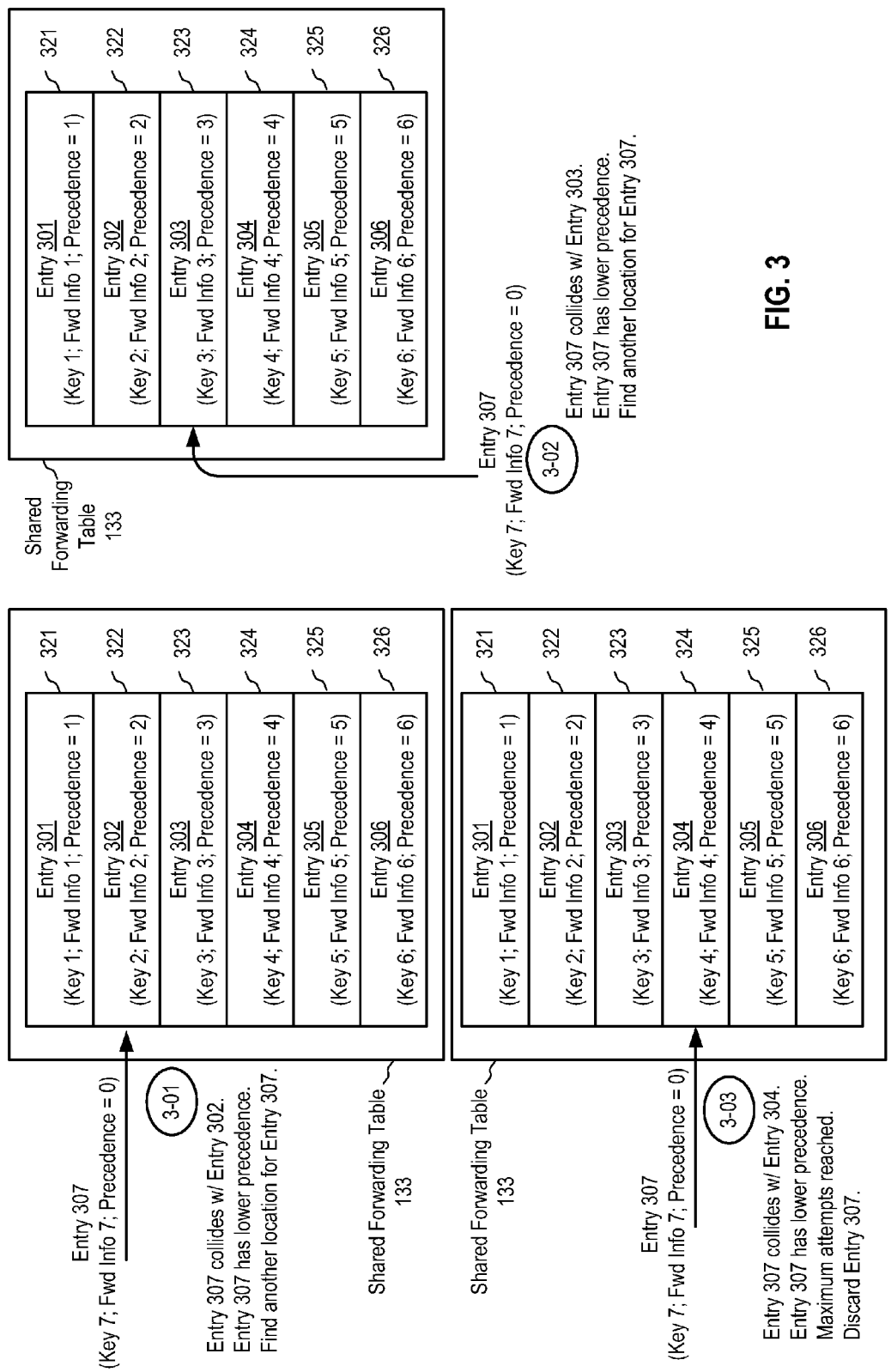
FIG. 3 is a block diagram illustrating an example of discarding an entry after the number of collision resolution attempts have reached a predetermined threshold according to one embodiment.

FIG. 3 is a block diagram illustrating an example of discarding an entry after the number of collision resolution attempts has reached a predetermined threshold. In FIG. 3, shared forwarding table 133 includes locations 321-326. Locations 321-326 are occupied by entries 301-306, respectively. Entries 301-306 have the precedence values 1-6, respectively.

At transaction 3-01, index generator 131 generates an index for unprocessed entry 307. In this example, the index points to location 322. Collision detector 132 determines that there is a collision (i.e., entry 307 collides with entry 302 at location 322). Collision detector 132 determines that entry 307 has a precedence of 0, which is lower than the precedence of entry 302. In response to such a determination, collision detector 132 performs collision resolution in order to find another location for entry 307.

Collision detector 132 can perform collision resolution using any collision resolution algorithm known in the art. For example, in an embodiment where table generator 121 is configured to generate shared forwarding table 133 as a hash table, collision detector 132 may implement a collision resolution algorithm such as separate chaining, open addressing, coalesced hashing, cuckoo hashing, robin hood hashing, 2-choice hashing, hopscotch hashing, or any combination thereof. Thus, the collision resolution mechanism/algorithm described throughout the description is intended for illustrative purposes, and not intended to be limitations of the present invention.

At transaction 3-02, collision detector 132 completes its collision resolution process and determines location 323 as the next candidate location. Collision detector 132 determines that there is also a collision at location 323 (i.e., entry 307 collides with entry 303 at location 323). Collision detector 132 determines that entry 307 has a precedence of 0, which is lower than the precedence of entry 303. In response to such a determination, collision detector 132 performs another collision resolution in order to find another location for entry 307.

At transaction 3-03, collision detector 132 completes its collision resolution process and determines location 324 as the next candidate location. Collision detector 132 determines that there is also a collision at location 324 (i.e., entry 307 collides with entry 304 at location 324). Collision detector 132 determines that entry 307 has a precedence of 0, which is lower than the precedence of entry 304. Collision detector 132 determines that the number of collision resolution attempts has reached a predetermined threshold, and discards entry 307.

Figure 4:
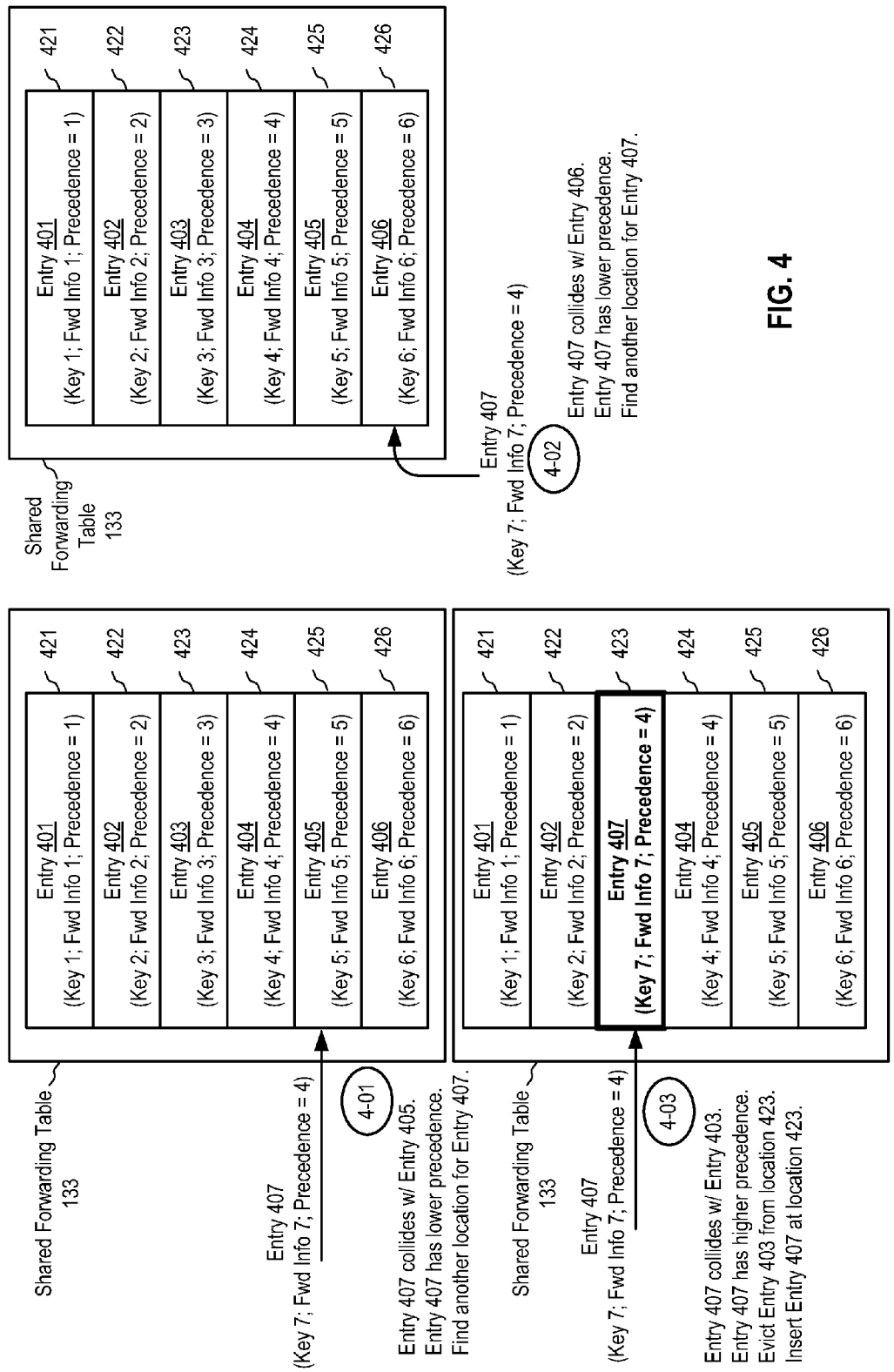
FIG. 4 is a block diagram illustrating an example of inserting an entry at a location in a shared forwarding table that contains a lower precedence entry according to one embodiment.

FIG. 4 is a block diagram illustrating an example of inserting an entry at a location occupied by a lower precedence entry. In FIG. 4, shared forwarding table 133 includes locations 421-426. Locations 421-426 are occupied by entries 401-406, respectively. Entries 401-406 have the precedence values 1-6, respectively.

At transaction 4-01, index generator 131 generates an index for unprocessed entry 407. In this example, the generated index points to location 425. Collision detector 132 determines that there is a collision (i.e., entry 407 collides with entry 405 at location 425). Collision detector 132 determines that entry 407 has a precedence of 4, which is lower than the precedence of entry 405. In response to such a determination, collision detector 132 performs collision resolution in order to find another location for entry 407.

At transaction 4-02, collision detector 132 completes its collision resolution process and determines location 426 as the next candidate location. Collision detector 132 determines that there is also a collision at location 426 (i.e., entry 407 collides with entry 406 at location 426). Collision detector 132 determines that entry 407 has a precedence of 4, which is lower than the precedence of entry 406. In response to such a determination, collision detector 132 performs another collision resolution in order to find another location for entry 407.

At transaction 4-03, collision detector 132 completes its collision resolution process and determines location 423 as the next candidate location. Collision detector 132 determines that there is also a collision at location 423 (i.e., entry 407 collides with entry 403 at location 423). Collision detector 132 determines that entry 407 has a precedence of 4, which is higher than the precedence of entry 403. In response to determining entry 407 has higher precedence than entry 403, collision detector 132 evicts entry 403 from location 423, and inserts entry 407 in its place. Thus, contrary to a conventional forwarding table generation mechanism, table generator 121 of the present invention can intelligently allocate resources to entries with higher precedence.

Referring now back to FIG. 1. In one embodiment, after evicting an entry from shared forwarding table 133, table generator 121 attempts to re-insert the evicted entry in shared forwarding table 133 at another location, using mechanisms similar to those described above. For example, for each evicted entry, collision detector 132 performs collision resolution to determine a candidate location for the evicted entry. In response to determining there is no collision at the candidate location, collision detector 132 inserts the evicted entry at the candidate location.

Alternatively, in response to determining there is a collision, collision detector 132 determines whether the number of collision resolution attempts have reached a predetermined threshold. If so, the evicted entry is discarded. Otherwise, collision detector 132 determines whether the entry which currently occupies the candidate location should be evicted in order to make room for the previously evicted entry. In one embodiment, collision detector 132 performs such a determination based on precedence information. In one such embodiment, in response to determining the entry that currently occupies the candidate location has a precedence value that is greater than or equal to the precedence value of the previously evicted entry, collision detector 132 attempts to perform collision resolution for the previously evicted entry until an unoccupied location is found, a location containing an entry with a lower precedence is found, or the number of collision resolution attempts has reached the predetermined threshold.

According to one embodiment, the predetermined collision resolution attempt threshold operates as an individual limit on each individual new and evicted entry. Assume for example, that the predetermined threshold is 3. In such an embodiment, collision detector 132 can perform up to 3 collision attempts for a new entry, and up to 3 collision attempts for each evicted entry. For example, assume that collision detector 132 determines that a new entry collides with a higher precedence entry, and performs a first out of 3 collision resolution attempts for the new entry. Assume that collision detector 132 determines that the new entry again collides with another higher precedence entry, and performs a second out of 3 collision resolution attempts for the new entry. Assume that on the second attempt, collision detector 132 determines that the new entry collides with a lower precedence entry, evicts the lower precedence entry, and inserts the new entry in its place. At this point, collision detector 132 may perform up to 3 collision resolution attempts for the evicted entry, even though 2 attempts were made for the new entry. If the evicted entry causes another entry to be evicted, collision detector 132 can perform up to 3 collision attempts for the second evicted entry, and so on.

In an alternative embodiment, the predetermined threshold operates as a cumulative limit on the number of collision resolution attempts that can be made for a new entry and all entries that were evicted because of the new entry. Assume for example, that the predetermined threshold is 3. In such an embodiment, collision detector 132 can perform up to 3 collision attempts for a new entry and all entries evicted because of the new entry. For example, assume that collision detector 132 determines that a new entry collides with a higher precedence entry, and performs a first out of 3 collision resolution attempts for the new entry. Assume that collision detector 132 determines that the new entry again collides with another higher precedence entry, and performs a second out of 3 collision resolution attempts for the new entry. Assume that on the second attempt, collision detector 132 determines that the new entry collides with a lower precedence entry, evicts the lower precedence entry, and inserts the new entry in its place. At this point, collision detector 132 may perform only one more collision resolution attempt for the evicted entry, because 2 attempts were made for the new entry. Assume that after performing a collision resolution attempt for the evicted entry, collision detector 132 determines that the evicted entry collides with a lower precedence entry, evicts the lower precedence entry, and inserts the previously evicted entry in its place. At this point, collision detector 132 discards the second evicted entry because all 3 collision resolution attempts have been utilized.

The mechanisms for distributing precedence information have been described with respect to network device 101. It shall be understood that the mechanisms can be implemented in any network device of control plane 105. Further, the mechanisms for generating a shared forwarding table based on the distributed precedence information are not limited to network device 103. One with ordinary skill in the art would recognize that the mechanisms can be implemented in any network device of forwarding plane 106.

Figure 5:
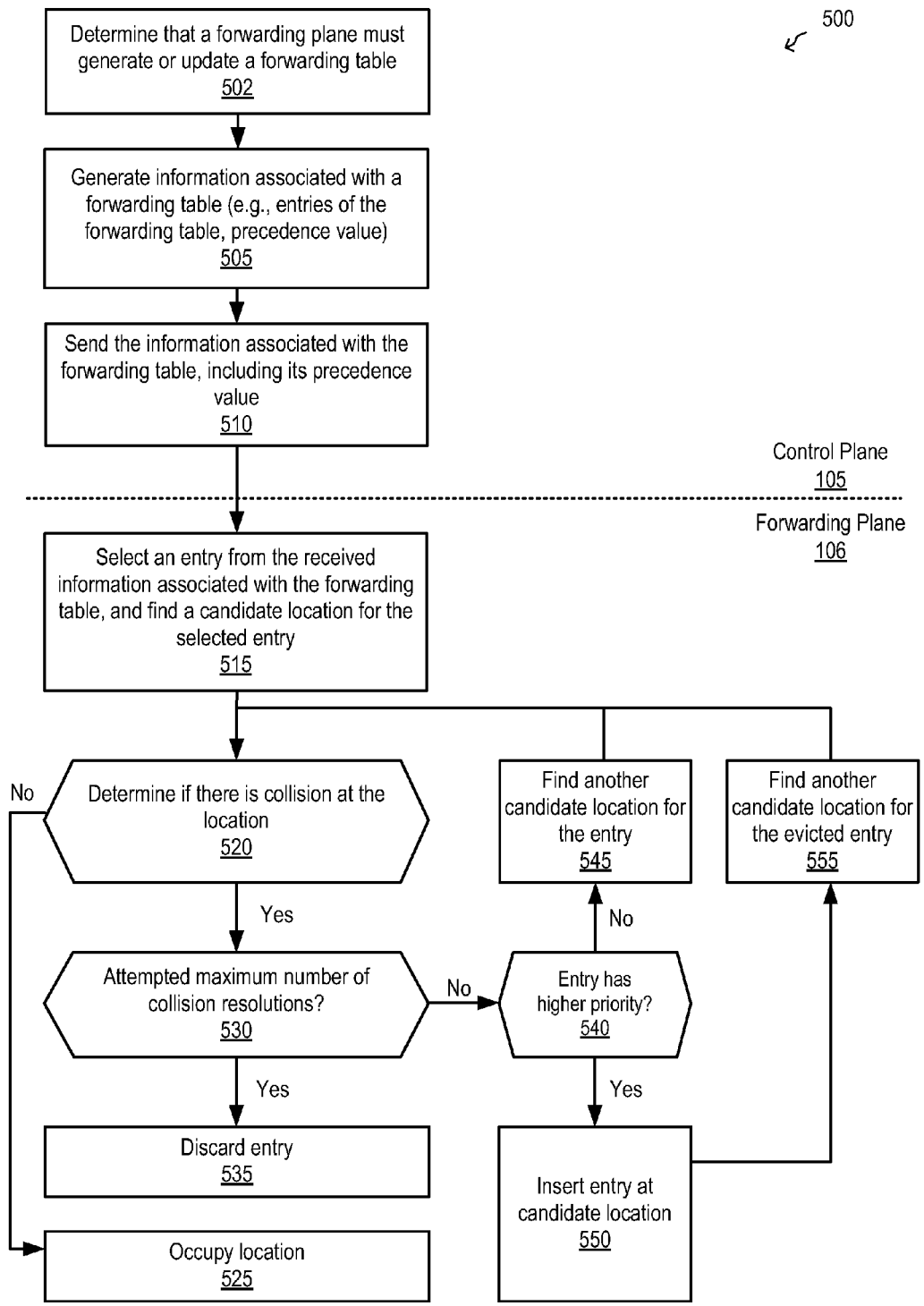
FIG. 5 is a flow diagram illustrating a method for maintaining a shared forwarding table according to one embodiment.

FIG. 5 is a flow diagram illustrating method 500 for maintaining a shared forwarding table according to one embodiment. For example, method 500 can be performed by control plane 105 (e.g., precedence controller 111 of network device 101 of control plane 105) and forwarding plane 106 (e.g., table generator 121 of network device 103 of forwarding plane 106). Method 500 can be implemented in software, firmware, hardware, or any combination thereof. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 5. At block 502, a precedence controller determines that a forwarding plane must generate or update a forwarding table. For example, precedence controller 111 determines that table generator 121 must generate (or update) a forwarding table (e.g., a LFIB, FDB, VT table, etc.) that is to be (or that has been) implemented as part of shared forwarding table 133.

At block 505, the precedence controller generates information associated with the forwarding table. The information associated with the forwarding table may include, for example, entries of the forwarding table. Each entry may include, for example, an input key (e.g., a MPLS label, MAC address, VLAN ID, etc.) and output forwarding information (e.g., MPLS label, egress port ID, VLAN ID, etc.) as described above with respect to FIG. 1. It shall be understood, however, that the entries can include any information required by the forwarding plane to generate the forwarding table. According to one embodiment, the precedence controller also generates a precedence value for the forwarding table. The precedence value identifies/indicates the priority (i.e., importance) of the forwarding table. Such precedence information enables a forwarding plane to determine which entries to store in a shared forwarding table when there is not enough hardware resources to accommodate all entries of all forwarding tables in the system.

At block 510, the precedence controller sends the generated information associated with the forwarding table, including the precedence information, to a table generator in a forwarding plane. For example, precedence controller 111 sends forwarding table information 108 to table generator 121.

At block 515, in response to receiving the information associated with the forwarding table from the control plane, the table generator selects an entry from the received information (i.e., a new entry) to insert into a shared forwarding table. For example, table generator 121 selects an entry from forwarding table information 108 to insert into shared forwarding table 133. As part of block 515, the table generator determines a candidate location in the shared forwarding table (e.g., by generating an index using a hash function) to insert the selected entry.

At block 520, the table generator determines if there is a collision at the candidate location (e.g., as part of transactions 2-01, 3-01, and 4-01). In response to determining there is a no collision, at block 525, the table generator inserts the unprocessed entry at the candidate location (e.g., as part of transaction 2-02). Here, the unprocessed entry refers to an entry that needs to be inserted in the shared forwarding table. The unprocessed entry can be a new entry selected at block 515, or an entry evicted at block 550 (described further below).

Alternatively, in response to determining there is a collision, at block 530, the table generator determines if the number of collision resolution attempts has reached a predetermined threshold. In response to determining the predetermined threshold has been reached, at block 535, the table generator discards the unprocessed entry (e.g., as part of transaction 3-03).

Alternatively, in response to determining the number of collision resolution attempts has not reached the predetermined threshold, at block 540, the table generator determines whether the unprocessed entry has a higher precedence than the entry which currently occupies the candidate location. At block 545, in response to determining the unprocessed entry does not have a higher precedence than the entry which currently occupies the candidate location, the table generator performs collision resolution to find another candidate location for the unprocessed entry (e.g., as part of transactions 3-01, 3-02, 4-01, and 4-02). The table generator then transitions back to block 520 to repeat the process.

Alternatively, in response to determining the unprocessed entry has a higher precedence than the entry which currently occupies the candidate location, at block 550, the table generator evicts the entry which currently occupies the candidate location, and inserts the unprocessed entry in its place (e.g., as part of transaction 3-03). At block 555, the table generator performs collision resolution to determine a candidate location for the evicted entry (which is now the unprocessed entry). The table generator then transitions back to block 520 to repeat the process. It shall be understood that the table generator performs blocks 515-555 for each entry included in the information associated with the forwarding table received from control plane 105.

An electronic device or a computing device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 6A:
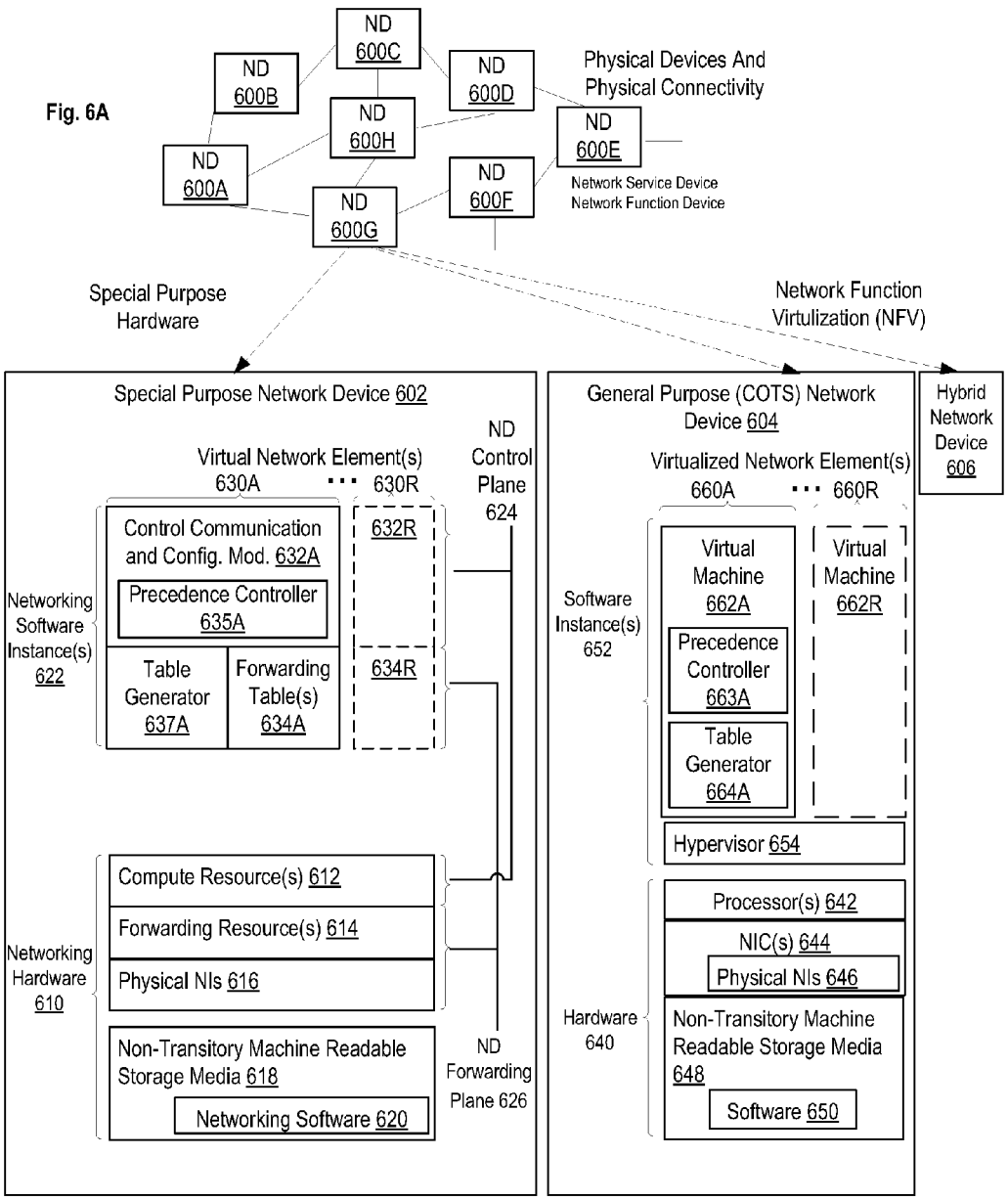
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

According to one embodiment, one or more of control communication and configuration module(s) 632A-R include a precedence controller for performing operations similar to those performed by precedence controller 111. For example, control communication and configuration module 632A includes precedence controller 635A for performing operations similar to those performed by precedence controller 111. According to one embodiment, one or more of network element(s) 630A-R includes a table generator for performing operations similar to those performed by table generator 121. For example, network element 630A includes table generator 637A for performing operations similar to those performed by table generator 121.

Figure 6B:
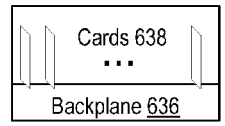
FIG. 6B illustrates an exemplary way to implement the special-purpose network device 602 according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

According to one embodiment, one or more of virtual machines 662A-R includes a precedence controller for performing operations similar to those performed by precedence controller 111. For example, virtual machine 662A includes precedence controller 663A for performing operations similar to those performed by precedence controller 111. According to one embodiment, one or more of virtual machines 662A-R includes a table generator for performing operations similar to those performed by table generator 121. For example, virtual machine 662A includes table generator 664A for performing operations similar to those performed by table generator 121.

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service— e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612; in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP) as well as RSVP-Traffic Engineering (TE): Extensions to RSVP for LSP Tunnels, Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682. Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach). According to one embodiment, centralized reachability and forwarding information module 679 includes precedence controller 681 for performing operations similar to those performed by precedence controller 111.

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

According to one embodiment, one or more of NE 670A-H includes a table generator for performing operations similar to those performed by table generator 121. For example, NE 670E includes table generator 683 for performing operations similar to those performed by table generator 121.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
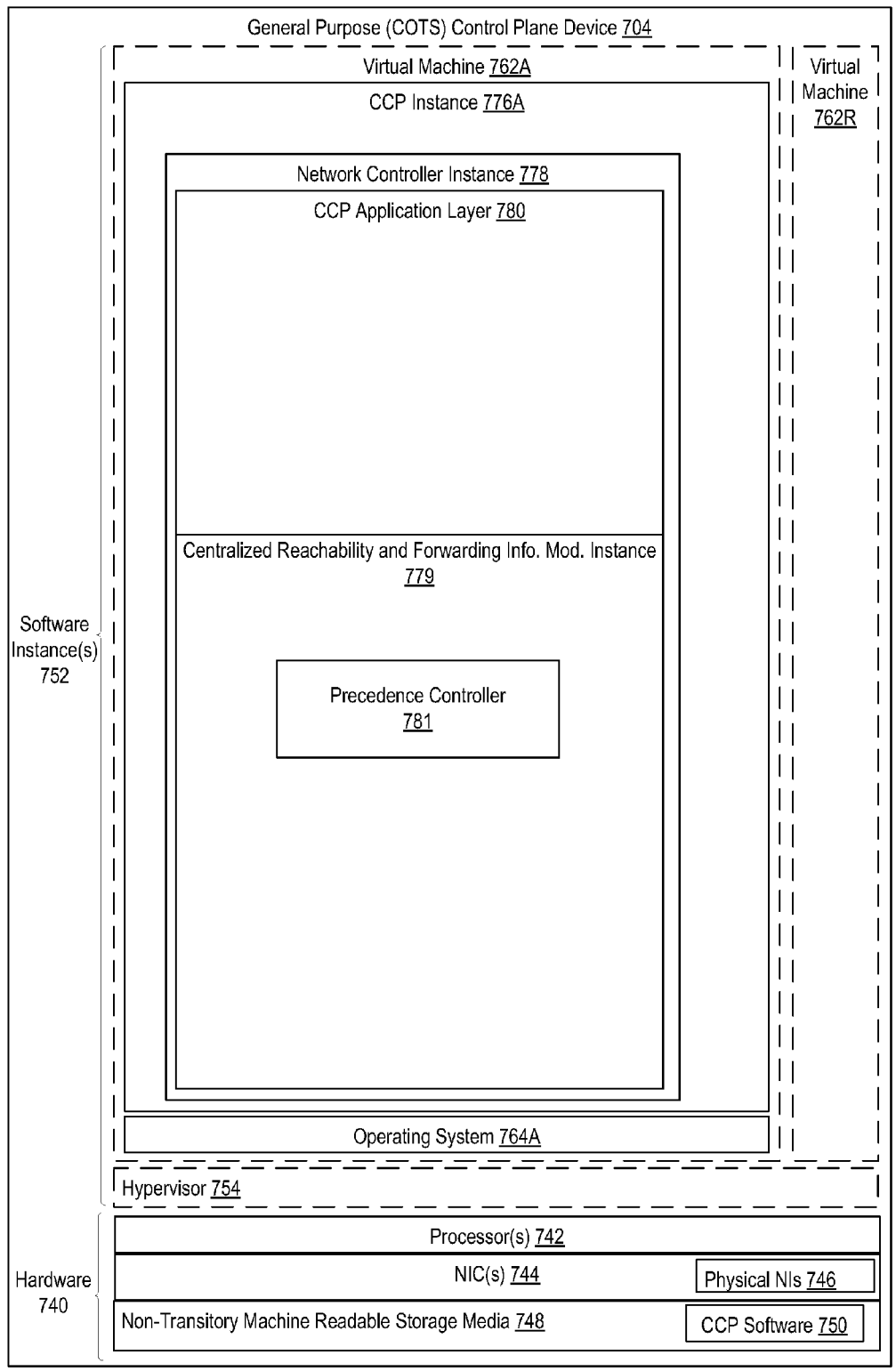
FIG. 7 illustrates a general purpose control plane device 704 including hardware 740 comprising a set of one or more processor(s) 742 (which are often Commercial off-the-shelf (COTS) processors) and network interface controller(s) 744 (NICs; also known as network interface cards) (which include physical NIs 746), as well as non-transitory machine readable storage media 748 having stored therein centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 678 to the operating system 764A and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view. According to one embodiment, centralized reachability and forwarding information module instance 779 includes precedence controller 781 for performing operations similar to those performed by precedence controller 111.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Various standards known in the art define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device operating as a Software Defined Networking (SDN) switch in a forwarding plane of an SDN network for maintaining a shared forwarding table based on forwarding table precedence information received from a second network device operating as an SDN controller in a control plane of the SDN network, the method comprising:

receiving information associated with a first forwarding table from the second network device, the information including a plurality of entries and precedence information, the precedence information indicating a priority of the plurality of entries of the first forwarding table;

for each entry of the first forwarding table, determining whether the entry should be inserted in the shared forwarding table based on the precedence information of the first forwarding table and precedence information contained in the shared forwarding table, wherein the first network device stores the shared forwarding table, wherein the shared forwarding table implements a plurality of forwarding tables, wherein the precedence information contained in the shared forwarding table indicates a priority of each corresponding entry stored in the shared forwarding table; and in response to determining precedence information of a first entry of the first forwarding table indicating it has higher priority than a first entry stored in a first candidate location in the shared forwarding table, evicting the first entry stored in the shared forwarding table from the first candidate location, inserting the first entry of the first forwarding table in the first candidate location, and determining a second candidate location in the shared forwarding table for the evicted first entry that was stored in the first candidate location.

2. The method of claim 1, further comprising:

determining the first candidate location in the shared forwarding table for the first entry of the first forwarding table; and in response to determining the first candidate location is occupied by a first entry stored in the shared forwarding table, determining whether the first entry stored in the shared forwarding table should be evicted from the first candidate location based on the precedence information of the first entry of the first forwarding table and precedence information of the first entry stored in the shared forwarding table.

3. The method of claim 2, further comprising:
in response to determining the precedence information of the first entry stored in the shared forwarding table indicating it has a priority that is higher than or equal to a priority of the first entry of the first forwarding table, determining a second candidate location in the shared forwarding table for the first entry of the first forwarding table.

4. The method of claim 3, further comprising:
prior to determining each candidate location, determining whether a number of attempts at determining the candidate location has reached a predetermined threshold; and
in response to determining the number of attempts has reached the predetermined threshold, discarding an entry for which the candidate location is being determined.

5. A first network device to operate as a Software Defined Networking (SDN) switch in a forwarding plane of an SDN network that maintains a shared forwarding table based on forwarding table precedence information received from a second network device operating as an SDN controller in a control plane of the SDN network, the first network device comprising:
a set of one or more processors; and
a non-transitory machine-readable storage medium containing code, which when executed by the set of one or more processors, cause the first network device to:
receive information associated with a first forwarding table from the second network device, the information including a plurality of entries and precedence information, the precedence information indicating a priority of the plurality of entries of the first forwarding table,
for each entry of the first forwarding table, determine whether the entry should be inserted in the shared forwarding table based on the precedence information of the first forwarding table and precedence information contained in the shared forwarding table, wherein the first network device stores the shared forwarding table, wherein the shared forwarding table implements a plurality of forwarding tables, wherein the precedence information contained in the shared forwarding table indicates a priority of each corresponding entry stored in the shared forwarding table, and
in response to determining precedence information of a first entry of the first forwarding table indicating it has higher priority than a first entry stored in a first candidate location in the shared forwarding table, evict the first entry stored in the shared forwarding table from the first candidate location, insert the first entry of the first forwarding table in the first candidate location, and determine a second candidate location in the shared forwarding table for the evicted first entry that was stored in the first candidate location.

6. The first network device of claim 5, wherein for each entry of the first forwarding table, determining whether the entry should be inserted in the shared forwarding table comprises the first network device to:
determine the first candidate location in the shared forwarding table for the first entry of the first forwarding table; and
in response to determining the first candidate location is occupied by a first entry stored in the shared forwarding table, determine whether the first entry stored in the shared forwarding table should be evicted from the first candidate location based on the precedence information of the first entry of the first forwarding table and precedence information of the first entry stored in the shared forwarding table.

7. The first network device of claim 6, wherein for each entry of the first forwarding table, determining whether the entry should be inserted in the shared forwarding table further comprises the first network device to:
in response to determining the precedence information of the first entry stored in the shared forwarding table indicating it has a priority that is higher than or equal to a priority of the first entry of the first forwarding table, determine a second candidate location in the shared forwarding table for the first entry of the first forwarding table.

8. The first network device of claim 7, wherein the non-transitory machine-readable storage medium further contains code, which when executed by the set of one or more processors, cause the first network device to:
prior to determining each candidate location, determine whether a number of attempts at determining the candidate location has reached a predetermined threshold; and
in response to determining the number of attempts has reached the predetermined threshold, discard an entry for which the candidate location is being determined.

9. A non-transitory computer-readable storage medium having computer code stored therein, which when executed by a processor of a first network device operating as a Software Defined Networking (SDN) switch in a forwarding plane of an SDN network, cause the first network device to perform operations for maintaining a shared forwarding table based on forwarding table precedence information received from a second network device operating as an SDN controller in a control plane of the SDN network, the operations comprising:
receiving information associated with a first forwarding table from the second network device, the information including a plurality of entries and precedence information, the precedence information indicating a priority of the plurality of entries of the first forwarding table;
for each entry of the first forwarding table, determining whether the entry should be inserted in the shared forwarding table based on the precedence information of the first forwarding table and precedence information contained in the shared forwarding table, wherein the first network device stores the shared forwarding table, wherein the shared forwarding table implements a plurality of forwarding tables, wherein the precedence information contained in the shared forwarding table indicates a priority of each corresponding entry stored in the shared forwarding table; and
in response to determining precedence information of a first entry of the first forwarding table indicating it has higher priority than a first entry stored in a first candidate location in the shared forwarding table, evicting the first entry stored in the shared forwarding table from the first candidate location, inserting the first entry of the first forwarding table in the first candidate location, and determining a second candidate location in the shared forwarding table for the evicted first entry that was stored in the first candidate location.

10. The non-transitory computer-readable storage medium of claim 9, wherein the computer code, when executed by the processor of the first network device, causes the first network device to perform further operations comprising:
  determining the first candidate location in the shared forwarding table for the first entry of the first forwarding table; and
  in response to determining the first candidate location is occupied by a first entry stored in the shared forwarding table, determining whether the first entry stored in the shared forwarding table should be evicted from the first candidate location based on the precedence information of the first entry of the first forwarding table and precedence information of the first entry stored in the shared forwarding table.

11. The non-transitory computer-readable storage medium of claim 10, wherein the computer code, when executed by the processor of the first network device, causes the first network device to perform further operations comprising:
  in response to determining the precedence information of the first entry stored in the shared forwarding table indicating it has a priority that is higher than or equal to a priority of the first entry of the first forwarding table, determining a second candidate location in the shared forwarding table for the first entry of the first forwarding table.

12. The non-transitory computer-readable storage medium of claim 11, wherein the computer code, when executed by the processor of the first network device, causes the first network device to perform further operations comprising:
  prior to determining each candidate location, determining whether a number of attempts at determining the candidate location has reached a predetermined threshold; and
  in response to determining the number of attempts has reached the predetermined threshold, discarding an entry for which the candidate location is being determined.

13. A method in a first network device operating as a Software Defined Networking (SDN) controller in a control plane of an SDN network for distributing precedence information of a plurality of forwarding tables to a second network device operating as an SDN switch in a forwarding plane of the SDN network, wherein the precedence information is used by the second network device to maintain a shared forwarding table, the method comprising:
  sending information associated with a first forwarding table to the second network device, the information including a plurality of entries and precedence information, the precedence information indicating a priority of the plurality of entries of the first forwarding table, wherein the information of the first forwarding table causes the second network device to, for each entry of the first forwarding table, determine whether the entry should be inserted in the shared forwarding table based on the precedence information of the first forwarding table and precedence information contained in the shared forwarding table, wherein the first network device stores the shared forwarding table, wherein the shared forwarding table implements a plurality of forwarding tables, wherein the precedence information contained in the shared forwarding table indicates a priority of each corresponding entry stored in the shared forwarding table, wherein the information of the first forwarding table further causes the second network device to determine that precedence information of a first entry of the first forwarding table indicates it has higher priority than a first entry stored in a first candidate location in the shared forwarding table and in response evict the first entry stored in the shared forwarding table from the first candidate location, insert the first entry of the first forwarding table in the first candidate location, and determine a second candidate location in the shared forwarding table for the evicted first entry that was stored in the first candidate location.

14. The method of claim 13, wherein the information of the first forwarding table causes the second network device to perform operations comprising:
  determining the first candidate location in the shared forwarding table for the first entry of the first forwarding table; and
  in response to determining the first candidate location is occupied by a first entry stored in the shared forwarding table, determining whether the first entry stored in the shared forwarding table should be evicted from the first candidate location based on the precedence information of the first entry of the first forwarding table and precedence information of the first entry stored in the shared forwarding table.

15. The method of claim 14, wherein the information of the first forwarding table causes the second network device to perform operations further comprising:
  in response to determining the precedence information of the first entry stored in the shared forwarding table indicating it has a priority that is higher than or equal to a priority of the first entry of the first forwarding table, determining a second candidate location in the shared forwarding table for the first entry of the first forwarding table.

16. A first network device to operate as a Software Defined Networking (SDN) controller in a control plane of an SDN network that distributes precedence information of a plurality of forwarding tables to a second network device operating as an SDN switch in a forwarding plane of the SDN network, wherein the precedence information is used by the second network device to maintain a shared forwarding table, the first network device comprising:
  a set of one or more processors; and
  a non-transitory machine-readable storage medium containing code, which when executed by the set of one or more processors, cause the first network device to:
    send information associated with a first forwarding table to the second network device, the information including a plurality of entries and precedence information, the precedence information indicating a priority of the plurality of entries of the first forwarding table, wherein the information of the first forwarding table causes the second network device to, for each entry of the first forwarding table, determine whether the entry should be inserted in the shared forwarding table based on the precedence information of the first forwarding table and precedence information contained in the shared forwarding table, wherein the first network device stores the shared forwarding table, wherein the shared forwarding table implements a plurality of forwarding tables, wherein the precedence information contained in the shared forwarding table indicates a priority of each corresponding entry stored in the shared forwarding table, wherein the information of the first forwarding table further causes the second network device to determine that precedence information of a first entry of the first forwarding table indicates it has higher priority than a first entry stored in a first candidate location in the shared forwarding table and in response evict the first entry stored in the shared forwarding table from the first candidate location, insert the first entry of the first forwarding table in the first candidate location, and determine a second candidate location in the shared forwarding table for the evicted first entry that was stored in the first candidate location.

17. The first network device of claim 16, wherein the information of the first forwarding table causes the second network device to perform operations comprising:
   determining the first candidate location in the shared forwarding table for the first entry of the first forwarding table; and
   in response to determining the first candidate location is occupied by a first entry stored in the shared forwarding table, determining whether the first entry stored in the shared forwarding table should be evicted from the first candidate location based on the precedence information of the first entry of the first forwarding table and precedence information of the first entry stored in the shared forwarding table.

18. The first network device of claim 17, wherein the information of the first forwarding table causes the second network device to perform operations further comprising:
   in response to determining the precedence information of the first entry stored in the shared forwarding table indicating it has a priority that is higher than or equal to a priority of the first entry of the first forwarding table, determining a second candidate location in the shared forwarding table for the first entry of the first forwarding table.

19. A non-transitory computer-readable storage medium having computer code stored therein, which when executed by a processor of a first network device operating as a Software Defined Networking (SDN) controller in a control plane of an SDN network, cause the first network device to perform operations for distributing precedence information of a plurality of forwarding tables to a second network device operating as an SDN switch in a forwarding plane of the SDN network, wherein the precedence information is used by the second network device to maintain a shared forwarding table, the operations comprising:
   sending information associated with a first forwarding table to the second network device, the information including a plurality of entries and precedence information, the precedence information indicating a priority of the plurality of entries of the first forwarding table, wherein the information of the first forwarding table causes the second network device to, for each entry of the first forwarding table, determine whether the entry should be inserted in the shared forwarding table based on the precedence information of the first forwarding table and precedence information contained in the shared forwarding table, wherein the first network device stores the shared forwarding table, wherein the shared forwarding table implements a plurality of forwarding tables, wherein the precedence information contained in the shared forwarding table indicates a priority of each corresponding entry stored in the shared forwarding table, wherein the information of the first forwarding table further causes the second network device to determine that precedence information of a first entry of the first forwarding table indicates it has higher priority than a first entry stored in a first candidate location in the shared forwarding table and in response evict the first entry stored in the shared forwarding table from the first candidate location, insert the first entry of the first forwarding table in the first candidate location, and determine a second candidate location in the shared forwarding table for the evicted first entry that was stored in the first candidate location.

20. The non-transitory computer-readable storage medium of claim 19, wherein the information of the first forwarding table causes the second network device to perform operations comprising:
   determining the first candidate location in the shared forwarding table for the first entry of the first forwarding table; and
   in response to determining the first candidate location is occupied by a first entry stored in the shared forwarding table, determining whether the first entry stored in the shared forwarding table should be evicted from the first candidate location based on the precedence information of the first entry of the first forwarding table and precedence information of the first entry stored in the shared forwarding table.

21. The non-transitory computer-readable storage medium of claim 20, wherein the information of the first forwarding table causes the second network device to perform operations further comprising:
   in response to determining the precedence information of the first entry stored in the shared forwarding table indicating it has a priority that is higher than or equal to a priority of the first entry of the first forwarding table, determining a second candidate location in the shared forwarding table for the first entry of the first forwarding table.

22. A method in a virtual machine operating as a Software Defined Networking (SDN) switch in a forwarding plane of an SDN network for maintaining a shared forwarding table based on forwarding table precedence information received from a second network device operating as an SDN controller in a control plane of the SDN network, the method comprising:
   receiving information associated with a first forwarding table from the second network device, the information including a plurality of entries and precedence information, the precedence information indicating a priority of the plurality of entries of the first forwarding table;
   for each entry of the first forwarding table, determining whether the entry should be inserted in the shared forwarding table based on the precedence information of the first forwarding table and precedence information contained in the shared forwarding table, wherein the virtual machine stores the shared forwarding table, wherein the shared forwarding table implements a plurality of forwarding tables, wherein the precedence information contained in the shared forwarding table indicates a priority of each corresponding entry stored in the shared forwarding table; and
   in response to determining precedence information of a first entry of the first forwarding table indicating it has higher priority than a first entry stored in a first candidate location in the shared forwarding table, evicting the first entry stored in the shared forwarding table from the first candidate location, inserting the first entry of the first forwarding table in the first candidate location, and determining a second candidate location in the shared forwarding table for the evicted first entry that was stored in the first candidate location.

23. The method of claim 22, further comprising:
determining the first candidate location in the shared forwarding table for the first entry of the first forwarding table; and
in response to determining the first candidate location is occupied by a first entry stored in the shared forwarding table, determining whether the first entry stored in the shared forwarding table should be evicted from the first candidate location based on the precedence information of the first entry of the first forwarding table and precedence information of the first entry stored in the shared forwarding table.

24. The method of claim 23, further comprising:
in response to determining the precedence information of the first entry stored in the shared forwarding table indicating it has a priority that is higher than or equal to a priority of the first entry of the first forwarding table, determining a second candidate location in the shared forwarding table for the first entry of the first forwarding table.

25. The method of claim 24, further comprising:
prior to determining each candidate location, determining whether a number of attempts at determining the candidate location has reached a predetermined threshold; and
in response to determining the number of attempts has reached the predetermined threshold, discarding an entry for which the candidate location is being determined.

* * * * *